April 21, 1970   F. CARRERO RIVES   3,507,045
RULE WITH INTERCHANGEABLE SCALES
Filed Jan. 11, 1968
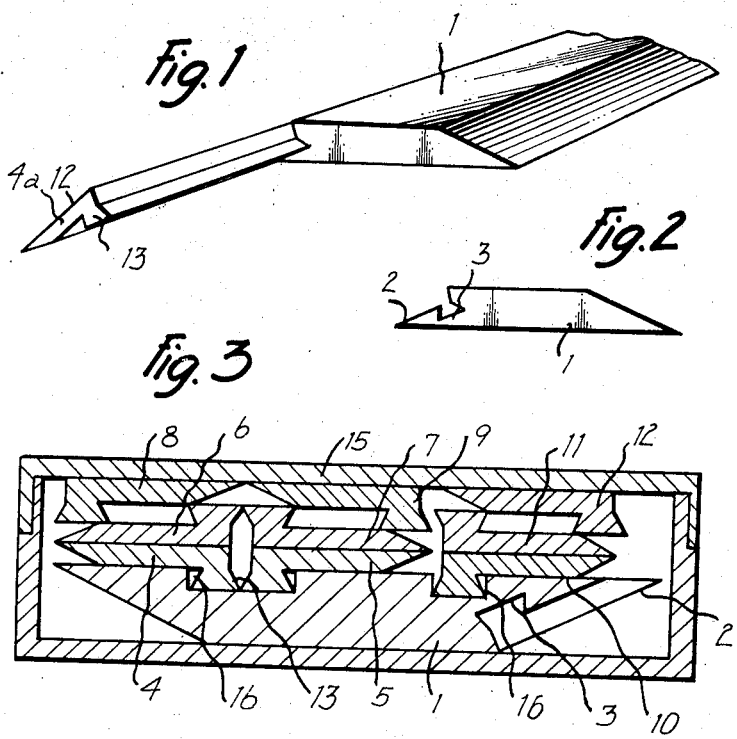
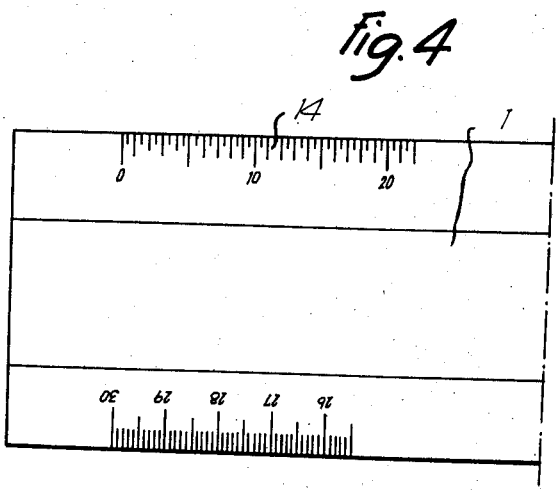
INVENTOR.
FRANCISCO CARRERO RIVES
BY Steinberg & Blake
attys United States Patent Office 3,507,045
Patented Apr. 21, 1970

3,507,045
RULE WITH INTERCHANGEABLE SCALES
Francisco Carrero Rives, Calle Bruch 66,
Barcelona, Spain
Filed Jan. 11, 1968, Ser. No. 697,056
Claims priority, application Spain, Jan. 11, 1967,
127,385
Int. Cl. B43l 7/00; G01b 3/04
U.S. Cl. 33—107   5 Claims

ABSTRACT OF THE DISCLOSURE

A rule to be used by draftsmen architects, and the like, and having a rule body capable of selectively receiving one of a plurality of different scales. The rule body is formed along one of its side edges with an elongated recess and groove means, while each of the several interchangeable scales has an elongated filler portion for filling the recess of the recess and groove means and an elongated tongue for filling the groove of the recess and groove means while being longitudinally slidable therealong. In this way any one of the several scales can be interchanged for any other one of the several scales simply by sliding one scale off the rule body and replacing it by another. With this arrangement only the selected scale will be available at the side of the rule body which is formed with the recess and groove means.

---

The present invention has for its object a rule with interchangeable scales, providing excellent practical results, comparing favorably with known rules.

As is known, the usual rules consist generally of a triangular body, containing six different sets of graduations. These rules, widely used, are not very practical since the number of scales mentioned distracts from the attention of the user and makes it necessary for him to look each time for the scale he needs to use, as well as because the rule, having 3 bases, will be laid down involuntarily on any of its sides by the user, preoccupied with his work, or turned over, so that consequently the scale with which he is working cannot be seen.

On the other hand, since the number of sets of graduations is usually limited to six, it will be necessary to have a set of various rules. This means that space will be needed to keep them, plus the resulting economical expenses.

These inconveniences have been eliminated by the rule with interchangeable scales to which this description refers and which consists of a flat rule body with two bevels which are so graduated that at least one of them presents a longitudinal recess into which scales can be fitted, on which any of various graduations can be marked, and which graduations can be assembled with the rule body, preferably by means of a longitudinal tongue with which they are provided and which fits into a groove formed in the above mentioned recess.

The rule is combined with a case in which can be lodged the rule proper and various elongated scale strips, some of which can be placed in juxtaposition on their edges, with their assembly tongues fitting into hollows provided in the lower side of the rule body, whilst other scales will be superposed amongst each other and those above mentioned, so that the whole of the rule body and of the set of scales occupies a limited space when stored.

The attached drawings show, by way of example without limitation to the scope of the present invention, a preferred way of construction, in diagram.

In said drawings, FIGURE 1 shows how the coupling of the scales to the rule body is made; FIGURE 2 is a lateral elevation of the rule body without the interchangeable scales; FIGURE 3 represents a cross section in which can be seen the rule with its set of scales inside the case, and FIGURE 4 is a partial top view of the rule body with one of its removable scales fitted to it.

Thus, referring to the drawing, it will be seen that the rule body 1 has elongated opposed side edges. The left side edge, as viewed in FIG. 2, is formed with a recess and groove means which includes the recess 2 and the groove 3 extending therefrom. The scales 4–12 can be interchangeably connected with the rule body 1, and these scales will respectively have different sets of graduations thereon. Each of these scales has an elongated filler portion which fills the recess 2 and an elongated tongue 13 which is slidable within and fills the groove 3. In this way any selected one of the several scales can be assembled with the rule body 1 and thereafter interchanged for a different one of scales. The assembly and disassembly of a scale from the body 1 takes place by longitudinal sliding movement of the tongue 13 in the groove 3.

It is particularly to be noted that the recess 2 is defined in part by a surface directed upwardly from the bottom surface of the body 1, as is particularly apparent from FIG. 2. In this way the body 1 is formed with a bevel along its side edge which is formed with the recess and groove means. Each of the scales 4–12 when assembled with the rule body 1 has a bottom surface situated directly next to and forming an extension of the bottom surface of the rule body, as is apparent from FIGS. 1 and 3. Moreover, the upwardly directed surface of the recess 2 and the surface of each scale which slidably engages the latter are both flat. The tongue 13 and groove 3 coact to prevent movement of each scale transversely of the upwardly directed flat surface which defines part of the recess 2.

While it is known to provide along a vertical side edge of a rule body a horizontal groove of dovetail cross section, for example, to slidably receive a mating tongue, the structure of the invention described above is far superior. As has already been noted above, the rule body 1 and the scales 4–12 are of limited thickness. As a result, only a limited thickness is available for a vertical side edge which is formed with a dovetail groove. As a result the thickness of the groove and the tongue with this conventional construction must be maintained extremely small, so that the parts cannot be made of a very robust construction. When it is remembered that these parts are commonly made of wood or plastic, then the weakness of this conventional construction is clearly apparent.

In contrast, with the structure of the invention because the groove 3 extends from the upwardly directed inclined surface which defines part of the recess 2, it is possible to make this groove 3 of substantial width, and of course the tongue 13 is also made of substantial thickness. This thickness of the tongue 13 and transverse width of the groove 3 is far greater than the dimensions possible in a vertical direction. It will be noted that with the construction shown in the drawings the groove 3 and tongue 13 have a transverse dimension which is almost as great as the thickness of the body 1. Therefore, with the structure of the invention not only do the groove 3 and tongue 13 coact to prevent sliding of the scale transversely of the upwardly directed inclined surface of the recess 2, but in addition it is possible to provide an assembly of limited thickness with a substantial, robust interconnection at the tongue and groove, so that even though the parts are made of material such as wood or plastic nevertheless it is not essential to limit the width of the groove 3 and the thickness of the tongue 13 undesirably.

Said scales 4–12 have marked on them as many different sets of graduations, 14 so that through the aforesaid assemblage these scales 4–12 can be placed selectively into the rule body 1. This has, for one thing, the advantage that, by the disposition of a suitable number of different sets of graduations, it is possible to work easily with a single flat rule body, with the desired scale inside of it, without having to look through several scales as occurs with the conventional triangular rules, and without the resulting loss of time. As it is not necessary to have several rules to provide for all necessities, not so much storage space is required, since, for example a flat case 15, the rule body 1 and the set of scales 4–12 can be provided for storing placed as shown in FIGURE 3, with the tongues 13 of some of these plates fitting into the hollows 16 provided in the underside of the rule.

It will be understood that because of the limited thickness of the scales it is possible to have a very extensive set of such scales, stored in a small size case.

What is claimed is:

1. A rule comprising an elongated rule body having a pair of opposed elongated side edges one of which is formed with a recess and groove means including a recess and a groove extending therefrom, and a plurality of scales interchangeably connectable with said body, said scales respectively having different sets of graduations thereon and each scale having an elongated filler portion for filling said recess and an elongated tongue longitudinally slidable within and filling said groove of said recess and groove means, so that a selected one of said plurality of scales can be assembled with said rule body and thereafter interchanged for a different one of said scales, each of said scales being assembled with and disassembled from said body by longituidnal sliding movement of said tongue in said groove, said recess of said body being defined in part by a surface directed upwardly from the bottom surface of said body to provide said body with a bevel along said side edge which is formed with said recess and groove means, each scale when assembled with said rule body having a bottom surface situated directly next to and forming an extension of said bottom surface of said rule body, said upwardly directed surface which defines part of said recess being flat and each scale having a flat surface slidably engaging said flat upwardly directed surface to be supported thereby while said tongue in said groove prevents movement of each scale transversely of said upwardly directed flat surface which defines part of said recess.

2. The combination of claim 1 and wherein said rule body has along its side edge opposed to that which is formed with said recess and groove means an elongated bevelled configuration, and each of said scales when assembled with said body providing the latter with a bevelled configuration symmetrical with that of said rule body at the side edge thereof which is not formed with said recess and groove means.

3. The combination of claim 2 and wherein said bevelled side edge of said body which is not formed with said recess and groove means carries a scale permanently mounted on said body.

4. The combination of claim 1 and wherein said tongue and groove are both of dovetail cross section.

5. The combination of claim 1 and wherein said body is formed in said bottom surface thereof with longitudinally extending hollows for receiving the tongues of some of said scales to provide a compact storage of said body and said scales.

References Cited

UNITED STATES PATENTS

| | | | |
|---|---|---|---|
| 149,532 | 4/1874 | Sherwin | 33—161 |
| 1,391,621 | 9/1921 | Fenwirth | 235—70 X |
| 2,182,027 | 12/1939 | Little | 33—107 |
| 2,491,650 | 12/1949 | Eckel | 235—70 |
| 3,120,058 | 2/1964 | Walton | 33—103 |
| 3,273,246 | 9/1966 | Siberini | 33—103 |

FOREIGN PATENTS

| | | |
|---|---|---|
| 495,943 | 6/1950 | Belgium. |
| 981,485 | 1/1951 | France. |
| 809,967 | 8/1951 | Germany. |
| 545,720 | 7/1956 | Italy. |
| 980,410 | 5/1951 | France. |
| 983,774 | 6/1951 | France. |
| 840,206 | 5/1952 | Germany. |
| 911,334 | 5/1954 | Germany. |
| 273,443 | 7/1927 | Great Britain. |
| 497,989 | 9/1954 | Italy. |

RICHARD B. WILKINSON, Primary Examiner

S. A. WAL, Assistant Examiner

U.S. Cl. X.R.

235—70